US005893566A

United States Patent [19]

Miyaoh et al.

[11] Patent Number: 5,893,566
[45] Date of Patent: Apr. 13, 1999

[54] METAL LAMINATE GASKET WITH DIFFERENT COATING LAYERS

[75] Inventors: Yoshio Miyaoh, Tokyo; Susumu Inamura, Utsunomiya, both of Japan

[73] Assignee: Ishikawa Gasket Co., Ltd., Tokyo, Japan

[21] Appl. No.: 08/791,156

[22] Filed: Jan. 28, 1997

[30] Foreign Application Priority Data

Feb. 1, 1996 [JP] Japan .................................. 8-016264

[51] Int. Cl.⁶ ...................................................... F10J 15/08
[52] U.S. Cl. ............................................................ 277/592
[58] Field of Search ................................ 277/592, 593, 277/591, 595, 594

[56] References Cited

U.S. PATENT DOCUMENTS

| 5,150,910 | 9/1992 | Udagawa | 277/592 |
| 5,306,024 | 4/1994 | Udagawa | 277/592 |
| 5,330,200 | 7/1994 | Unseth | 277/592 |
| 5,490,681 | 2/1996 | Plunkett et al. | 277/592 |

FOREIGN PATENT DOCUMENTS

WO 93/08420   4/1993   WIPO .

*Primary Examiner*—Anthony Knight
*Assistant Examiner*—Greg Binda
*Attorney, Agent, or Firm*—Kanesaka & Takeuchi

[57] ABSTRACT

A metal laminate gasket of the invention is used for an internal combustion engine. The gasket is formed of a plurality of metal plates for constituting the metal laminate gasket, wherein each metal plate has a hole corresponding to a fluid hole of the engine. A bead is formed on one of the metal plates to surround the hole for sealing therearound. Outer surface layers are coated on outer surfaces of the metal laminate gasket, and at least one inner surface layer is coated on at least one of inner surfaces of the metal plates. The outer surface layers are formed of a material containing rubber to closely contact the gasket to the engine parts, and the inner surface layer is formed of a material containing resin to provide sliding ability between the metal plates. The gasket can securely seal between the engine parts.

4 Claims, 1 Drawing Sheet

METAL LAMINATE GASKET WITH DIFFERENT COATING LAYERS

BACKGROUND OF THE INVENTION AND RELATED ART STATEMENT

The present invention relates to a metal laminate gasket with different coating layers.

A metal laminate gasket formed of a plurality of metal plates has been known and used in an internal combustion engine, as a cylinder head gasket and a manifold gasket.

In case a cylinder head and a cylinder block are formed, surfaces of the cylinder head and the cylinder block with which the gasket contacts may be ground to form finishing surfaces. As a result, small scratches, such as cutter tracing, are formed.

It is preferable to have a smooth contact with the cylinder head and the cylinder block to securely seal between the cylinder head and the cylinder block. Therefore, a cylinder head gasket may have coating layers on one or both surfaces thereof to fill out the small scratches by the coating layers. Plating may be formed on the gasket instead of the coating.

Also, in the metal laminate gasket, fluid may enter into a space between the plates. In order to prevent fluid from entering into the space between the plates or to prevent fluid when it is entered into the space from freely flowing in the space, a coating layer may be formed in one of two plates contacting with each other.

The coating layers formed on or situated between the metal plates have been known already in the art, but the coating layers have specific characteristics, such as weakness in heat and pressure, depending on materials contained therein. For example, if high pressure and heat are applied to such a material, the coating may flow to cause reduction of a surface pressure. In this case, the sealing may not be properly made.

In view of the foregoing, the present invention has been made, and an object of the invention is to provide a metal laminate gasket with coating layers, which can properly seal between the plates as well as relative to the cylinder head and cylinder block.

Another object of the invention is to provide a metal laminate gasket as stated above, which can securely seal around a fluid hole.

Further objects and advantages of the invention will be apparent from the following description of the invention.

SUMMARY OF THE INVENTION

A metal laminate gasket of the invention is used for an internal combustion engine. The gasket is formed of a plurality of metal plates for constituting the metal laminate gasket, each metal plate having a hole corresponding to a fluid hole of the engine. A bead is formed on at least one of the metal plates to surround the hole for sealing therearound.

In the invention, outer surface or coating layers are coated on outer surfaces of the metal laminate gasket, and at least one inner surface or coating layer is coated on at least one of inner surfaces of the plurality of metal plates. The outer surface layers are formed of a material containing rubber to fit the cylinder head and the cylinder block, and at least one inner surface layer is formed of a material containing resin to provide sliding ability between the metal plates.

Accordingly, when the gasket is installed between the cylinder head and the cylinder block, the outer surface layers can fill small scratches in the cylinder head and the cylinder block and closely contact the cylinder head and the cylinder block. Thus, fluid is prevented from entering or passing between the cylinder head and the gasket, and between the cylinder block and the gasket.

When the engine is actuated, the cylinder head and the cylinder block slightly expand due to heat. In this case, lateral stress is applied to the gasket between the cylinder head and the cylinder block due to difference of heat expansion at the cylinder head and the cylinder block. In this situation, since the outer plates with the outer surface layers closely contact the cylinder head and the cylinder block, the outer plates do not substantially slide relative to the cylinder head and the cylinder block. However, since the inner surface layer is disposed between the plates, the plates slide with respect to each other along the inner surface layer to absorb the lateral stress.

In this case, since the plate with the bead slides relative to the plate facing thereto because of the inner coating layer, the inner coating layer on the bead does not peel off. Therefore, the sealing ability of the bead does not decrease.

The outer surface layer is preferably formed of a material selected from a group consisting of fluorine rubber and NBR, and the inner surface layer is formed of the material selected from a group consisting of silicone resin, fluorine resin and epoxy resin. Also, the thickness of the outer surface layer is made preferably thicker than the inner surface layer.

The gasket may be formed of only upper and lower plates, or may further include one or more intermediate plates. When the plates are laminated, one inner surface layer is interposed between the plates laminated together.

DETAILED DESCRIPTION OF PREFERRED EMBODIMENTS

Figure 1:
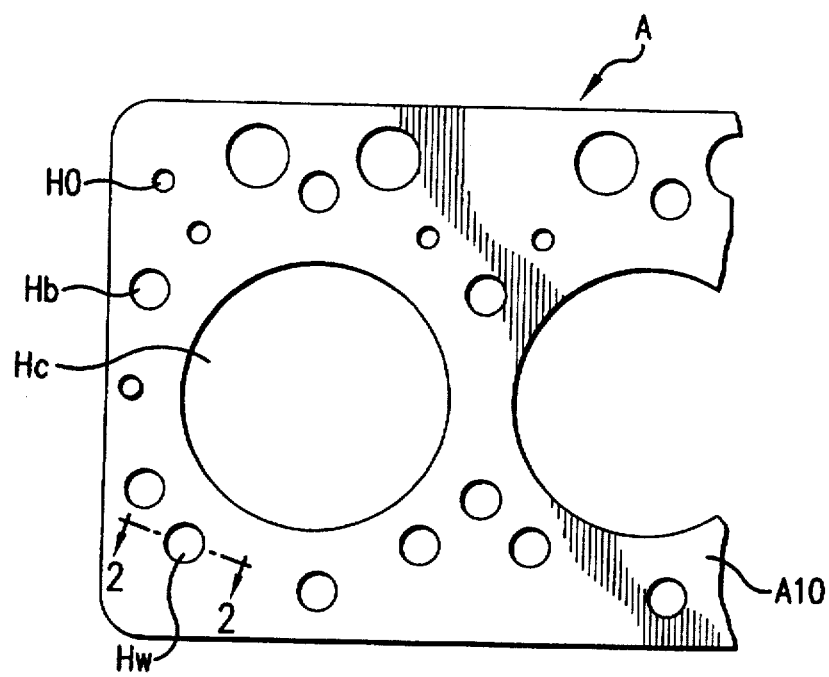
FIG. 1 is a partial plan view of a first embodiment of a metal laminate gasket of the invention.
Figure 2:
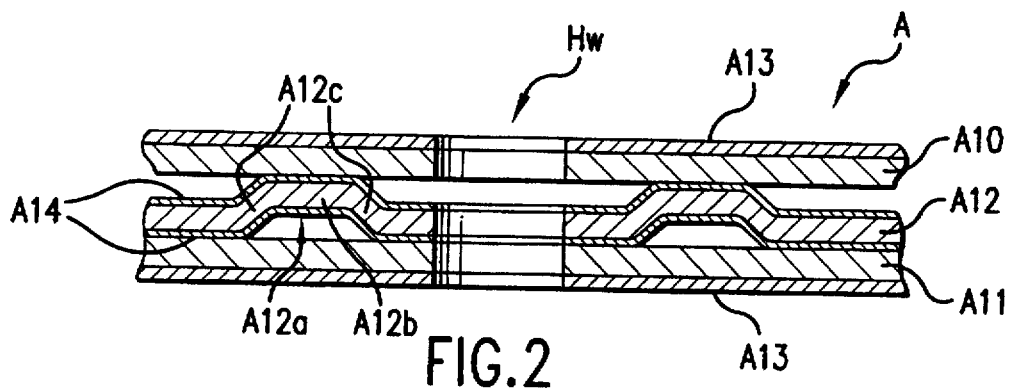
FIG. 2 is an enlarged sectional view taken along a line 2—2 in FIG. 1.

Referring to FIGS. 1 and 2, a first embodiment A of a metal laminate gasket of the invention is shown. The gasket A is a cylinder head gasket and is situated between a cylinder head and a cylinder block (both not shown). The gasket A includes a plurality of cylinder bores Hc, water holes Hw, oil holes Ho, bolt holes Hb and so on, as in the conventional gasket.

The invention is directed to the general structure of the gasket in association with a sealing mechanism around the water hole, so the general structure around the water hole Hw is explained. Other structures, such as sealing mechanisms for the cylinder bores Hc and so on, are not explained in the specification, but any structure may be used as desired.

The gasket A is formed of an upper metal plate A10, a lower metal plate A11, and an intermediate metal plate A12 situated between the upper and lower metal plates A10, A11. The plates A10, A11, A12 extend substantially throughout an entire area to be sealed between the cylinder head and the cylinder block.

The upper and lower plates A10, A11 are plane plates with holes for the water hole Hw. The intermediate plate A12 has a bead around a hole for the water hole Hw. The bead A12a has a flat top portion A12b and two side portions A12c, similar to a trapezoidal shape. When the bead A12a is compressed, the bead A12a provides a surface pressure to seal around the water hole Hw.

In the gasket A, outer surface or coating layers A13 are formed on an upper surface of the upper plate A10, and a lower surface of the lower plate A11. Also, inner surface or coating layers A14 are formed on both surfaces of the intermediate plate A12. The outer coating layers A13 are made thicker than the inner coating layers A14.

The outer coating layers A13 are formed of fluorine rubber, and the inner coating layers A14 are formed of silicone resin. These layers are coated when the plates are prepared. In addition, the outer coating layer A13 may be NBR or other materials containing rubber, and the inner coating layer A14 may be fluorine resin and epoxy resin or other materials containing suitable resin.

In the invention, it is required that the outer coating layer A13 can fit or closely contact the cylinder head and the cylinder block, and can fill small scratches of the cylinder head and the cylinder block. Also, it is important that the inner coating layer A14 provides sliding ability between the plates of the gasket.

When the gasket A is installed between the cylinder head and the cylinder block, the outer coating layers A13 contact the cylinder head and the cylinder block, and fill out small scratches formed in the cylinder head and the cylinder block. Since the outer coating layers A13 are not so strong against heat and pressure, the coating layers A13 may creep. However, since the outer coating layers A13 can closely contact the cylinder head and the cylinder block, even if the outer coating layers A13 creep, sealings between the cylinder head and the upper plate A10 and between the cylinder block and the lower plate A11 can be made properly.

The inner coating layer A14 is formed of resin, which is strong against heat and pressure without creep relaxation, and provides a sliding ability or characteristic between the plates. Since the inner coating layers A14 do not creep, even if the outer coating layers A13 creep, the gasket A can still properly seal between the cylinder head and the cylinder block.

When the engine with the gasket A is actuated, the cylinder head and the cylinder block expand slightly due to heat. In case the cylinder head and the cylinder block are not made of the same material, lateral stress is applied to the gasket due to the difference of heat expansion of the cylinder head and the cylinder block. In this case, the upper and lower plates A10, A11 closely contact the cylinder head and the cylinder block through the outer coating layers A13. However, since the inner coating layers A14 have a sliding characteristic, the upper and lower plates A10, A11 slightly slide relative to the intermediate plate A12 through the inner coating layers A14. Accordingly, lateral stress applied to the gasket can be absorbed properly.

Also, in the gasket A, since the bead A12a has the flat top portion A12b, the bead A12a does not provide extremely high surface pressure at one point. Also, since the bead A12a has the inner coating layer A14 on the flat top portion A12b, when the gasket A receives the lateral stress, the bead A12a can slide relative to the upper plate A10. Therefore, the inner coating is not easily peeled off from the top portion A12b of the bead A12a.

Figure 3:
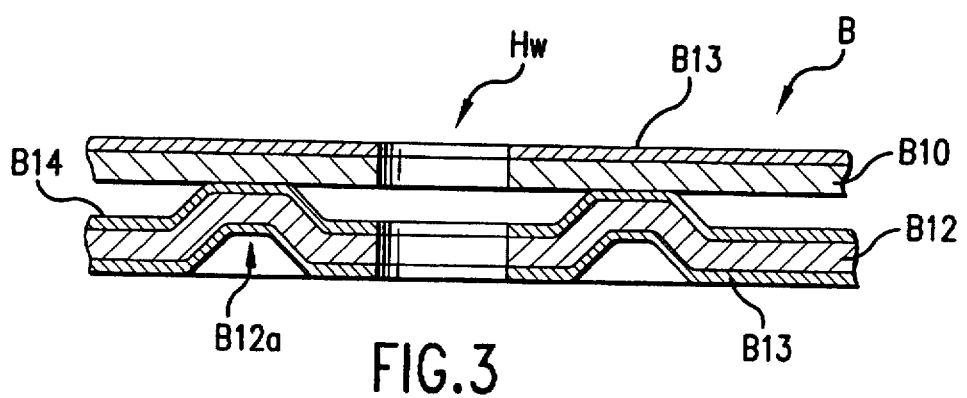
FIG. 3 is a sectional view, similar to FIG. 2, of a metal laminate gasket according to a second embodiment of the invention.

FIG. 3 is a second embodiment B of a metal laminate gasket of the invention. The gasket B is formed of an upper plate B10, a lower plate B12, and outer coating layers B13 coated on an upper surface of the plate B10 and a lower surface of the plate B12, similar to the gasket A. In the gasket B, however, there is no intermediate plate, and the lower plate B12 has a bead B12a around 10 a water hole Hw. Also, the lower plate B12 has an inner coating layer B14 at a side facing the upper plate B10. The outer coating layers B13 are made of the same material as the outer coating layers A13, and the inner coating layer B14 is made of the same material as the inner coating layers A14.

In the gasket B, the thickness can be made thin. However, the gasket B can operate as in the gasket A.

In the present invention, the gasket is provided with the combination of the outer coating layers containing rubber to provide good contact with the cylinder head and the cylinder block, and the inner coating layer containing resin to provide less creep relaxation in use. Also, the inner coating layer can provide a sliding ability. Therefore, as a whole, the gasket does not creep too much, but can provide a good sealing ability relative to the cylinder head and the cylinder block, and between the plates. Also, in the invention, the gasket can properly absorb lateral stress applied to the gasket.

While the invention has been explained with reference to the specific embodiments of the invention, the explanation is illustrative, and the invention is limited only by the appended claims.

What is claimed is:

1. A metal laminate gasket for an internal combustion engine having a fluid hole, comprising:

a plurality of metal plates for constituting the metal laminate gasket including upper and lower plates, each metal plate having a hole corresponding to the fluid hole;

a bead formed on one of the metal plates to surround the hole for sealing therearound and having a flat top portion;

outer surface layers coated on outer surfaces of the metal laminate gasket formed of said plurality of metal plates, said outer surface layers being formed of a material selected from a group consisting of fluorine rubber and NBR adapted to closely contact with engine parts where the gasket contacts; and at least one inner surface layer coated on at least one of inner surfaces of said plurality of metal plates and contacting the flat top portion of the bead, said at least one inner surface layer being formed of a material selected from a group consisting of silicone resin, fluorine resin and epoxy resin and directly contacting one of the inner surfaces of the metal plates facing thereto to provide sliding ability between the metal plates, the thickness of the outer surface layer being thicker than that of the inner surface layer.

2. A metal laminate gasket according to claim 1, further comprising an intermediate plate situated between the upper and lower plates, said intermediate plate having said bead, two inner surface layers being coated on both surfaces of the intermediate layer.

3. A metal laminate gasket according to claim 1, wherein said gasket is formed of only said upper and lower plates, said lower plate having the bead and the inner surface layer on a surface facing the upper plate.

4. A metal laminate gasket for an internal combustion engine having a fluid hole, comprising:

a plurality of metal plates for constituting the metal laminate gasket, each metal plate having a hole corresponding to the fluid hole;

a bead integrally formed with one of the metal plates as a part thereof to surround the hole for sealing therearound, and having a top flat portion;

outer surface layers coated on outer surfaces of the metal laminate gasket formed of said plurality of metal plates, said outer surface layers being formed of a material containing rubber adapted to closely contact with engine parts where the gasket contacts; and at least one inner surface layer coated on at least one of inner surfaces of said plurality of metal plates, said at least one inner surface layer being formed of a material containing resin and directly contacting one of the inner surfaces of the metal plates facing thereto to provide sliding ability between the metal plates, said at least one inner surface layer covering on and outside the bead and having a characteristic such that when the metal plates receive lateral forces different from each other, the inner surface layer allows the metal plates to slide to absorb the lateral forces applied thereto.

* * * * *

UNITED STATES PATENT AND TRADEMARK OFFICE
CERTIFICATE OF CORRECTION

PATENT NO. : 5,893,566
DATED      : April 13, 1999
INVENTOR(S): Yoshio Miyaoh and Susumu Inamura It is certified that error appears in the above-indentified patent and that said Letters Patent is hereby corrected as shown below:

In column 4, line 3, delete "10"; and line 55, change "layer" to --plate--.

Signed and Sealed this

Twenty-fourth Day of August, 1999

Attest:

Q. TODD DICKINSON

Attesting Officer

Acting Commissioner of Patents and Trademarks